United States Patent
Velazquez et al.

(10) Patent No.: US 8,813,121 B2
(45) Date of Patent: Aug. 19, 2014

(54) DELAYING EMERGENCY ALERT SYSTEM MESSAGES

(75) Inventors: Leonardo Velazquez, Plano, IL (US); James Love Ford, III, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 485 days.

(21) Appl. No.: 12/326,418

(22) Filed: Dec. 2, 2008

(65) Prior Publication Data

US 2010/0138858 A1 Jun. 3, 2010

(51) Int. Cl.

| | |
|---|---|
| *H04N 7/10* | (2006.01) |
| *H04N 21/435* | (2011.01) |
| *G08B 27/00* | (2006.01) |
| *H04N 21/81* | (2011.01) |
| *H04N 21/472* | (2011.01) |
| *H04N 21/235* | (2011.01) |
| *H04N 21/443* | (2011.01) |
| *H04N 21/643* | (2011.01) |

(52) U.S. Cl.
CPC ............ *H04N 21/435* (2013.01); *G08B 27/008* (2013.01); *H04N 21/8146* (2013.01); *H04N 21/47202* (2013.01); *H04N 21/235* (2013.01); *H04N 21/443* (2013.01); *H04N 21/814* (2013.01); *H04N 21/64322* (2013.01); *G08B 27/006* (2013.01)
USPC .......................................................... 725/33

(58) Field of Classification Search
CPC ............................. H04N 21/814; H04H 20/59
USPC ........................................... 725/33; 340/601
See application file for complete search history.

(56) References Cited

U.S. PATENT DOCUMENTS

| | | | |
|---|---|---|---|
| 5,874,985 A * | 2/1999 | Matthews, III | 725/32 |
| 6,204,761 B1 * | 3/2001 | Vanderable | 340/539.28 |
| 6,278,375 B1 * | 8/2001 | Hucker | 340/601 |
| 7,114,169 B1 * | 9/2006 | Kahn | 725/33 |
| 7,159,230 B2 | 1/2007 | Manson et al. | |
| 7,271,717 B1 | 9/2007 | Amos | |
| 7,389,104 B2 | 6/2008 | Phillips et al. | |
| 2002/0124252 A1 * | 9/2002 | Schaefer et al. | 725/33 |
| 2005/0030977 A1 * | 2/2005 | Casey et al. | 370/485 |
| 2005/0229206 A1 * | 10/2005 | Pugel et al. | 725/33 |
| 2005/0235331 A1 * | 10/2005 | Lynch | 725/100 |
| 2005/0273809 A1 * | 12/2005 | Kendall et al. | 725/33 |
| 2006/0271952 A1 * | 11/2006 | Gurley et al. | 725/33 |
| 2007/0083884 A1 * | 4/2007 | Kim et al. | 725/33 |
| 2008/0018452 A1 * | 1/2008 | McCarthy et al. | 340/531 |
| 2008/0070522 A1 | 3/2008 | Marriott et al. | |
| 2009/0031340 A1 * | 1/2009 | Modi et al. | 725/33 |
| 2009/0222852 A1 * | 9/2009 | Bartolome | 725/33 |
| 2009/0228917 A1 * | 9/2009 | Yun | 725/33 |
| 2010/0070994 A1 * | 3/2010 | Yun | 725/33 |
| 2011/0029870 A1 * | 2/2011 | May et al. | 715/710 |

* cited by examiner

*Primary Examiner* — Junior Mendoza
(74) *Attorney, Agent, or Firm* — Jackson Walker L.L.P.

(57) ABSTRACT

Methods and systems for delaying or dismissing emergency alert system (EAS) messages displayed within multimedia content, wherein user input is provided to temporarily delay for a user selectable or predetermined time period or to permanently dismiss EAS messages. Further user input may determine a snooze period during which the display of EAS messages is temporarily suspended. In some embodiments, EAS messages are automatically delayed until a commercial is displayed. In some embodiments, EAS messages are forwarded from a customer premises equipment device (e.g., a set-top box) to a user specified communication device (e.g., a mobile telephone or remote control device) while the presentation of a multimedia program continues.

13 Claims, 4 Drawing Sheets

DELAYING EMERGENCY ALERT SYSTEM MESSAGES

BACKGROUND

1. Field of the Disclosure

The present disclosure generally relates to multimedia content provider networks and more particularly to systems that provide emergency alert system messages.

2. Description of the Related Art

Multimedia content provider networks may present users with emergency alert system (EAS) messages intended to warn the users of potentially dangerous conditions (e.g., bad weather) near the user's location. The EAS messages are typically displayed while the user is viewing a multimedia program (e.g., a movie).

DESCRIPTION OF EXEMPLARY EMBODIMENTS

Figure 1:
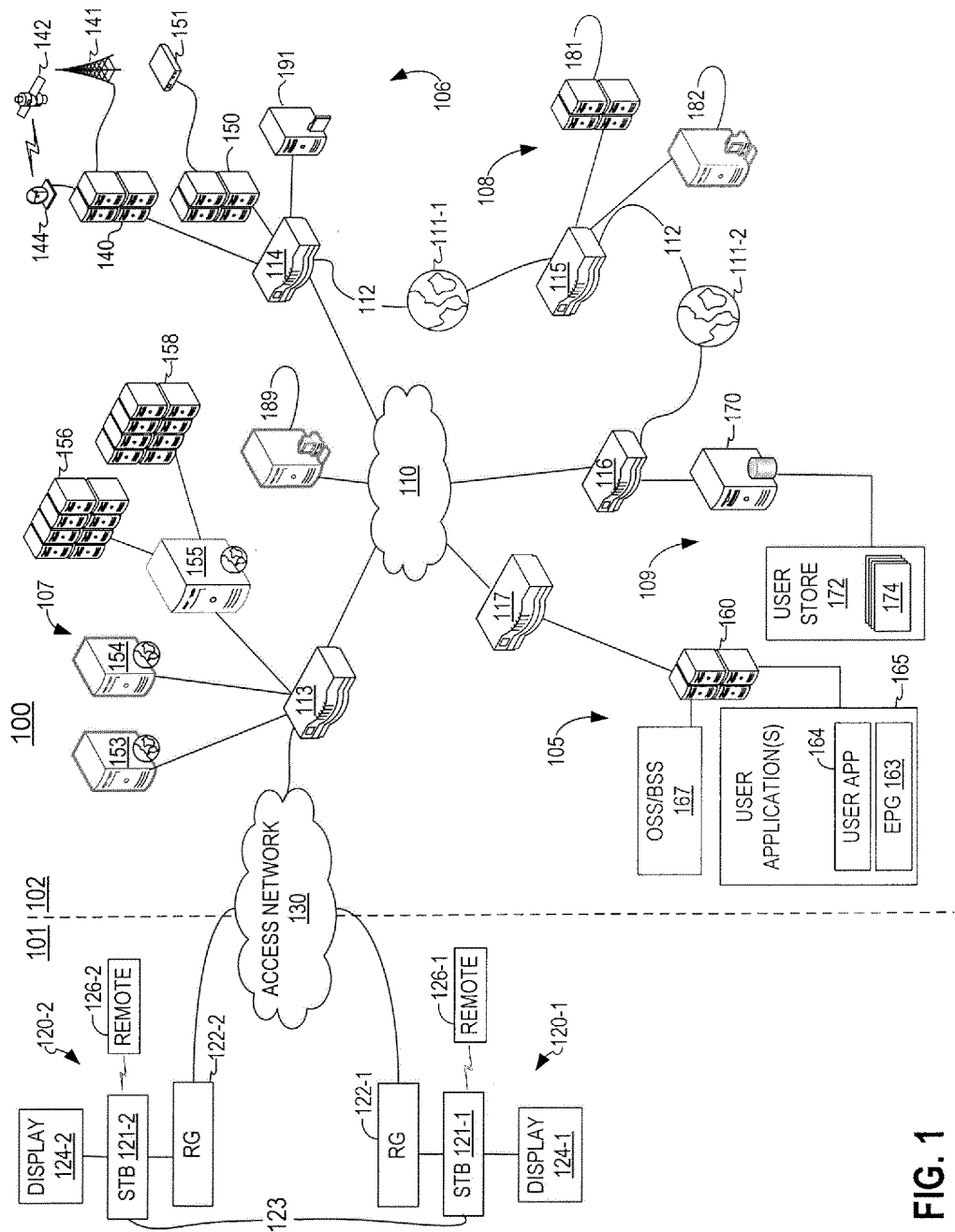
FIG. 1 illustrates a representative Internet Protocol Television (IPTV) architecture for providing EAS messages as an overlay on multimedia programs (e.g., movies), including subsystems for temporarily suspending the display of the EAS messages in response to user input.

In one aspect, a disclosed method provides delayed emergency alert messages (or emergency alerts or emergency alert notifications) during programs received from a multimedia content distribution network. The method includes providing a multimedia program for display, overlaying an emergency alert message on a portion of the displayed multimedia program, and discontinuing the display of the emergency alert message in response to user input. The multimedia program may be a video-on-demand (VOD), a pay per view (PPV) program, a music or national channel, a menu, or an electronic programming guide (EPG) or an electronic programming guide, as examples. The user input may include a dismiss command or a snooze command that results in the emergency alert message returning as an overlaid message after a snooze timeout. The dismiss and/or snooze commands may be provided using a graphical interface processed by a set-top box (STB), in which navigation of the graphical interface is performed through a remote control device communicatively coupled to the STB. In some embodiments, the method includes receiving an EAS alert at a video hub office, encoding the EAS alert, relaying the encoded EAS alert to a content server, and distributing the encoded EAS alert to a plurality of customer premises equipment (CPE).

In another aspect, a disclosed data processing system is adapted to provide emergency alerts during the presentation of multimedia programs. The data processing system includes a first interface adapted for receiving an emergency alert, a processor enabled for displaying an indication of the emergency alert as an overlay during the presentation of the multimedia program, and a second interface adapted for responding to receiving a user input by removing the overlaid display of the emergency alert while continuing the presentation of the multimedia program. The data processing system may be a CPE, may be integrated within a STB, or may be a content delivery server within a video hub office, as examples. The processor may be enabled, in some embodiments, to add selectable graphical elements to a display on a television or mobile device during the presentation of the emergency alert. User selection of the graphical elements results in temporary removal of the indication of the emergency alert, and the indication of the emergency alert may return after a snooze period.

In still another aspect, a computer program product stored on a tangible computer readable medium includes instructions for encoding a multimedia program, encoding an emergency alert message, displaying the multimedia program, displaying the emergency alert message as an overlay to a portion of the multimedia program, and receiving user input for temporarily stopping the displaying of the emergency alert message. Further instructions receive user input that sets a snooze period during which the display of the emergency alert message is temporarily stopped. Further instructions, in some embodiments, monitor one or more local primary stations for an emergency occurrence (i.e., emergency event) and display an emergency alert message that is responsive to and representative of emergency occurrence. In some embodiments, the emergency occurrence is registered only when it is received by a plurality of local primary stations.

Disclosed embodiments include enhanced EAS systems that enable customers to delay or completely dismiss emergency alert messages that are displayed as overlay message notifications on their televisions. Accordingly, customers may finish watching their current program and prevent interruptions from emergency alert notifications. Disclosed embodiments permit users to delay such notifications for a configurable period of time (i.e., a snooze period) so that they can, for example, prevent or minimize interruptions to important parts of a program (e.g., the end of the program).

Some emergency alerts are provided to customers by issuing an alerting tone and displaying an overlay message on channels provided to customers within a particular, affected area. Some multimedia content providers enhance the Federal Communication Commission (FCC) mandates by providing EAS messages both over national channel programming and over other IPTV activities such as VOD, PPV, menus, and EPGs. Disclosed embodiments provide customers with user controls and permit delaying (i.e., snoozing) such EAS messages. In some embodiments, selectable inputs (e.g., soft buttons) are provided on a television display or remote control to select a snooze feature and possibly set a snooze period. User inputs may be received locally using a remote control device or sent through a mobile telephone network, for example, to the multimedia content provider to delay or dismiss EAS messages. Such EAS messages may be delayed for a selectable or predetermined time period. Additionally, in some instances, the user may elect to view the EAS message at a later time during the transmission of the applicable multimedia program, such as during a commercial or at the end of the program that was being displayed when the EAS message was initially provided. In some embodiments, user input automatically delays EAS messages until the presence of a commercial (or other part of a multimedia program such as the end of the applicable program) is detected.

EAS alerts are commonly distributed through a relay chain of radio and television sources. Each member of the chain may either be an origination point (e.g., the National Weather Service for weather alerts) and/or a relay point. Alert information may be distributed in a standard message format that may be encoded as an analog audio signal, to reduce the complexity of relaying information to CPE (e.g., an STB). Disclosed embodiments may follow traditional processes for receiving emergency alert notifications from local news service providers, which may be referred to herein as "LP1," "LP2," . . . "LPn." When alerts are received in a Video Hub Office (VHO), an EAS encoder (e.g., an ENDEC) is often responsible for monitoring the alerts. The ENDEC relays detected EAS alert messages to an EAS controller (i.e., an EAC). In systems that include IPTV networks, emergency alerts are transmitted by the EAC and EAS alert messages are relayed to an IPTV Branch Management System via an IPTV operations support system/business support system (OSS/BSS) Gateway. An emergency alert is then generated in an IPTV Branch Management Database, which is then distributed to one or more CPE (e.g., STB) as an overlay message.

Disclosed embodiments present EAS messages as overlay messages that can be delayed for a configurable length of time (i.e., a snooze period) unless the EAS message is dismissed altogether by the user or by another alert. If the message is snoozed, it may start a snooze timer that keeps the message in a queue to be redisplayed after a snooze timeout (e.g., three minutes). Alternatively, a user may provide user input that results in the EAS message being delayed until later in the transmission of the applicable multimedia program (e.g., during a commercial) or being removed from the queue completely, to prevent redisplay. If no action is taken regarding snoozing the EAS message, the EAS message disappears after a predefined display time has expired or after the emergency event is over.

In some disclosed STBs, a timer internal to the STB tracks EAS messages if they are delayed (snoozed). For example, an EAS message about a weather watch may be issued, and in addition to displaying corresponding alert text information in the video provider's channels, the displayed alert message will have additional information to tell customers how to snooze and dismiss the alert. If the user chooses to snooze an EAS message, then the EAS message disappears for a pre-configurable period of time.

Disclosed embodiments provide an enhanced viewing experience by enabling users to control how emergency alert notifications are displayed on their televisions. For example, if the user is watching the final minutes of a major sporting event or a preferred multimedia program, and an emergency alert is issued, the user is given an opportunity to delay that notification, instead of completely dismissing it.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral may refer to a specific instance of an element and an un-hyphenated form of the reference numeral may refer to the element generically or collectively. Thus, for example, element 121-1 refers to an instance of an STB, which may be referred to collectively as STBs 121 and any one of which may be referred to generically as an STB 121. Before describing other details of embodied methods and devices, selected aspects of multimedia content provider networks that provide multimedia programs are described to provide further context.

Television programs, VOD movies, digital television content, music programming, and a variety of other types of multimedia content may be distributed to multiple users over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, PPV, advanced programming information (e.g., sophisticated and customizable EPGs), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 for delaying the display of EAS messages in accordance with disclosed embodiments. MCDN 100, as shown, is a multimedia content provider network that may be generally divided into a client side 101 and a service provider side 102 (a.k.a. server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 miles in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals. In such embodiments, a cable modem termination system (CMTS) may mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more VHOs. In large-scale implementations of MCDN 100, which may cover a geographic region comparable, for example, to the region served by telephony-based broadband services, private network 110 includes a hierarchy of VHOs.

A national or network video hub office (e.g., super video hub or SHO), for example, may deliver national content feeds to several regional VHOs, each of which may include its own acquisition resources to acquire local content, such as the local affiliate of a national network, and to inject local content such as advertising and public service announcements (e.g. EAS messages) from local entities. The regional VHOs may then deliver the local and national content to users served by the regional VHO. The hierarchical arrangement of SHOs and VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, OSS/BSS switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, Internet or other type of web-network where the public network 112 is signified in FIG. 1 by the World Wide Web icons 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL or cable modem, as well as elements of a firewall, router, and/or access point for an Ethernet or other suitable local area network (LAN) 123. In some embodiments, STB 121 is a uniquely addressable Ethernet compliant device. Display 124 may be, for example, any National Television System Committee (NTSC) and/or Phase Alternating Line (PAL) compliant display device. Both STB 121 and display 124 may include any form of conventional frequency tuner. As shown, remote control device 126 communicates wirelessly with STB 121 using infrared (IR) or RF signaling. STB 121-1 and STB 121-2, as shown, may communicate through LAN 123.

In IPTV compliant implementations of MCDN 100, clients 120 are configured to receive packet-based multimedia streams from access network 130 and process the streams for presentation on displays 124. In addition, clients 120 are network-aware resources that may facilitate bidirectional-networked communications with server side 102 resources to support network hosted services and features. Because clients 120 are configured to process multimedia content streams while simultaneously supporting more traditional web-like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol/Internet-protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

ENDEC 191 receives EAS alert messages issued by content providers and/or service providers. ENDEC 191 relays EAS alert messages to EAS controller 189 which logs EAS alert notifications and multicasts the EAS alert notification to an IPTV branch notification system by way of OSS/BSS resources 108. In turn, the IPTV branch notification system sends EAS alert messages to STBs 121, which encode indications of the EAS alert messages for overlay with the presentation of a multimedia program. In accordance with disclosed embodiments, users of STBs 121 may dismiss the EAS alert message for a configurable snooze period during which the multimedia program is presented without the EAS alert message as an overlay. After the snooze period, the EAS alert message may be redisplayed. The EAS alert message, after it is dismissed, may be added to an STB notification queue accessed by STBs 121.

In some embodiments, multiple service providers (e.g., news service providers) may be monitored (e.g., by ENDEC 191) for an emergency occurrence. If only one service provider (e.g., LP1) indicates an emergency occurrence, then some embodied services do not register an emergency occurrence. However, if another service provider (e.g., LP2) provides an indication of the same emergency occurrence, then the emergency occurrence is verified and logged as legitimate. A notification of the emergency occurrence is sent to, logged by, and/or stored in ENDEC 191. An EAS alert notification is sent to EAS controller 189, which notifies IPTV branch management through OSS/BSS gateway 167. In turn, IPTV branch management sends an EAS alert from a notification database (e.g., database server 170) to a notification server (e.g., application server 160 running a notification application as user application 164). The notification server (e.g., application server 160) prompts an overlay EAS alert notification message to STBs 121, which may receive user input over remote control devices 126 to cause a suspension for a configurable snooze period of the EAS alert notification.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. As shown, live acquisition server 140 is communicatively coupled to an encoder which, prior to transmission, encodes acquired content using for example, MPEG-2, H.263, MPEG-4,H.264,a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. The MPEG-2 transport stream may include video and audio portions of a multimedia program including EAS messages for a presentation on a user's display, which may receive one or more signals from a digital television STB, in accordance with disclosed embodiments. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized local loop or RG, client gateway 153 may block transmissions to and from STB 121 beyond the access network 130.

MCDN 100, as depicted, includes application resources 105, which communicate with private network 110 via application switch 117. Application resources 105, as shown, include application server 160 which is operable to host or otherwise facilitate one or more user applications 165 that are made available to system subscribers. For example, user applications 165, as shown, include EPG application 163. User applications 165 may include other applications as well. In addition to user applications 165, application server 160 may host or provide a gateway to OSS/BSS. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that provides a user with options for delaying EAS messages including delaying the messages or forwarding the messages to designated communication devices (e.g., a mobile telephones). User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

Figure 2:
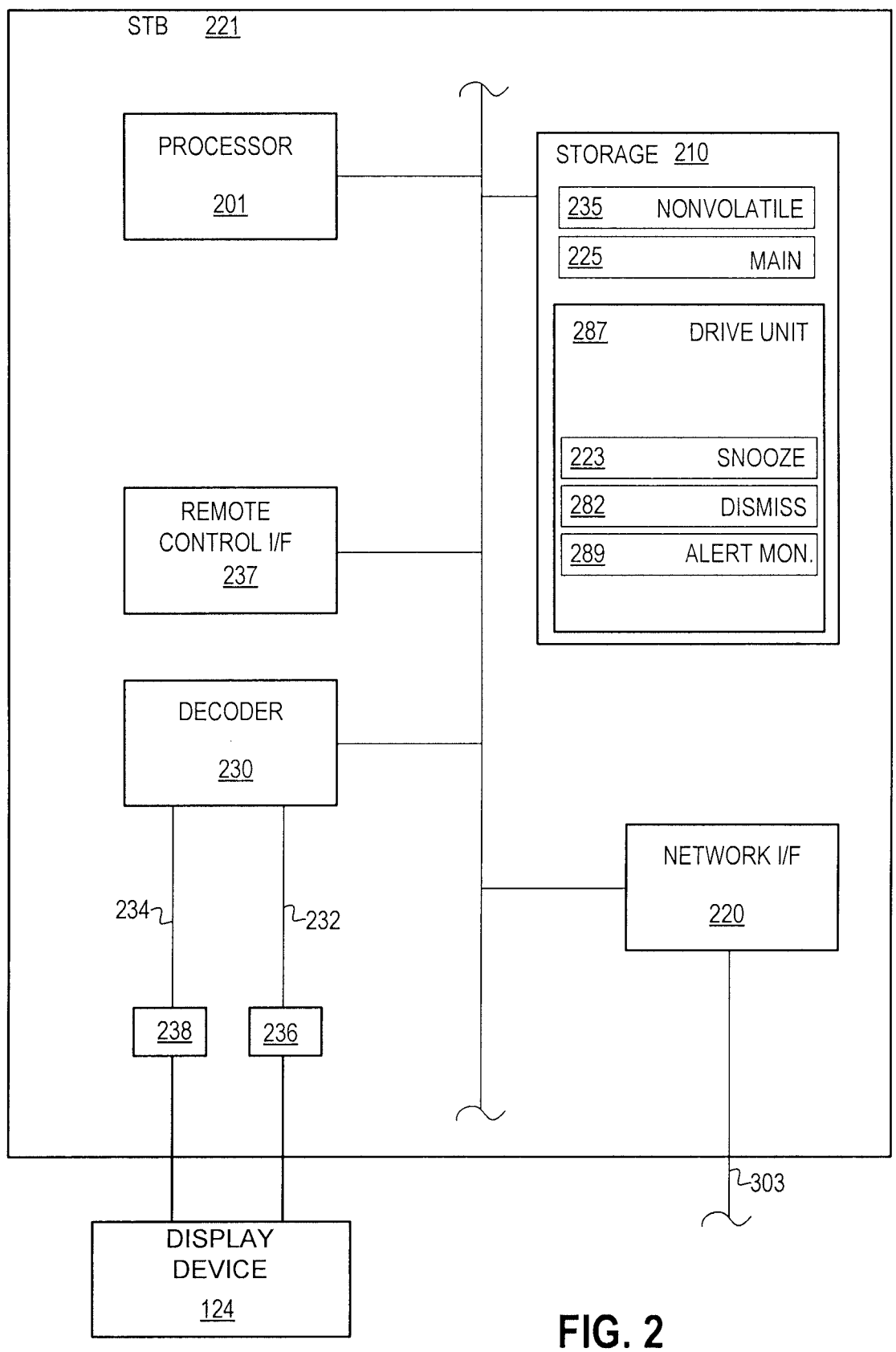
FIG. 2 depicts a set-top box (STB) that may be configured to detect an EAS occurrence and receive user input to delay the display of an EAS message indicative of the EAS occurrence until after a snooze period.

Referring now to FIG. 2, a block diagram illustrates selected elements of an embodiment of an STB 221, which may be identical to or similar to STBs 121 (FIG. 1). STB 221 may be an STB or other localized equipment (e.g., CPE) for providing a user with access in usable form to multimedia content such as digital television programs. In this implementation, STB 221 includes a processor 201 and general purpose storage 210 connected to a shared bus. A network interface 220 enables STB 221 to communicate with LAN 303 (e.g., LAN 123 from FIG. 1). An integrated audio/video decoder 230 generates native format audio signals 232 and video signals 234. Signals 232 and 234 are encoded and converted to analog signals by digital-to-analog (DAC)/encoders 236 and 238. The output of DAC/encoders 236 and 238 is suitable for delivering to an NTSC, PAL, or other type of display device 124. Network interface 220 may also be adapted for receiving information from a remote hardware device and other input that may be processed or forwarded by STB 221 to dismiss EAS notifications and set snooze periods for delaying EAS notifications. Remote control interface 237 processes user inputs from remote control devices and, in some cases, may process outgoing communications to two-way remote control devices.

As shown, general purpose storage 210 includes non-volatile memory 235, main memory 225, and drive unit 287. Data 217 may include user specific data (e.g., pre-set snooze parameters and periods) and other information used by STB 221 for presenting, delaying, and dismissing EAS alert notifications. As shown, drive unit 287 includes snooze module 223 which receives snooze period information from user input and notifies processor 201 when a snooze period has terminated. In some embodiments, snooze module 223 communicates over network interface 220 with remote devices (e.g., user application 164, EAS controller 189, or ENDEC 191) to provide notification that user has requested to temporarily delay receiving an EAS alert notification. Similarly, dismiss module 282 process dismiss input from a user and notifies processor 201 to discontinue permanently, if permitted, the display of an EAS alert notification as an overlay to a multimedia program presentation. Alert monitor 289 monitors one or more service providers (e.g., LP1, LP2) or notification servers to determine if an emergency event has occurred. In some embodiments, an emergency event (i.e., emergency occurrence) occurs when two or more service providers provide an indication of an emergency event. In other embodiments, an emergency event occurs upon notification by a notification server (e.g., OSS/BSS server 167 from FIG. 1, EAS controller 189 from FIG. 1, or ENDEC 191 from FIG. 1). Accordingly, STB 221 is enabled to process user input, process EAS alert notification data, and permit a user to delay the presentation of EAS alert notification messages for configurable periods of time (i.e., snooze periods).

As shown in FIG. 2, STB 221 is adapted to delay or dismiss emergency alerts during the presentation of multimedia programs. Accordingly, network interface 220 acts as a first interface adapted for receiving an emergency alert. In some embodiments, emergency alerts are received from EAC controllers within an MCDN. Processor 201 enables STB 221 to display on display device 124 an indication of the emergency alert as an overlay during a presentation of the multimedia program. Remote control interface 237 receives a user input, for example to snooze an emergency alert message, and processor 201 stops the displaying of the emergency alert message while continuing to present the multimedia program. As noted above, STB 121 communicates with server side devices through access network 130 via RG 122. In an alternative embodiment, STB 121 may access public network 112 or may use network interface 220 to forward the emergency alert (or information indicative of the emergency alert) to a user specified communication device (e.g., a mobile telephone or display configured remote control device) while the presentation of a multimedia program continues. Such forwarding may occur in addition to overlaying the emergency alert during a presentation of the multimedia program or may occur in lieu of overlaying the emergency alert during a presentation of the multimedia program.

Figure 3:
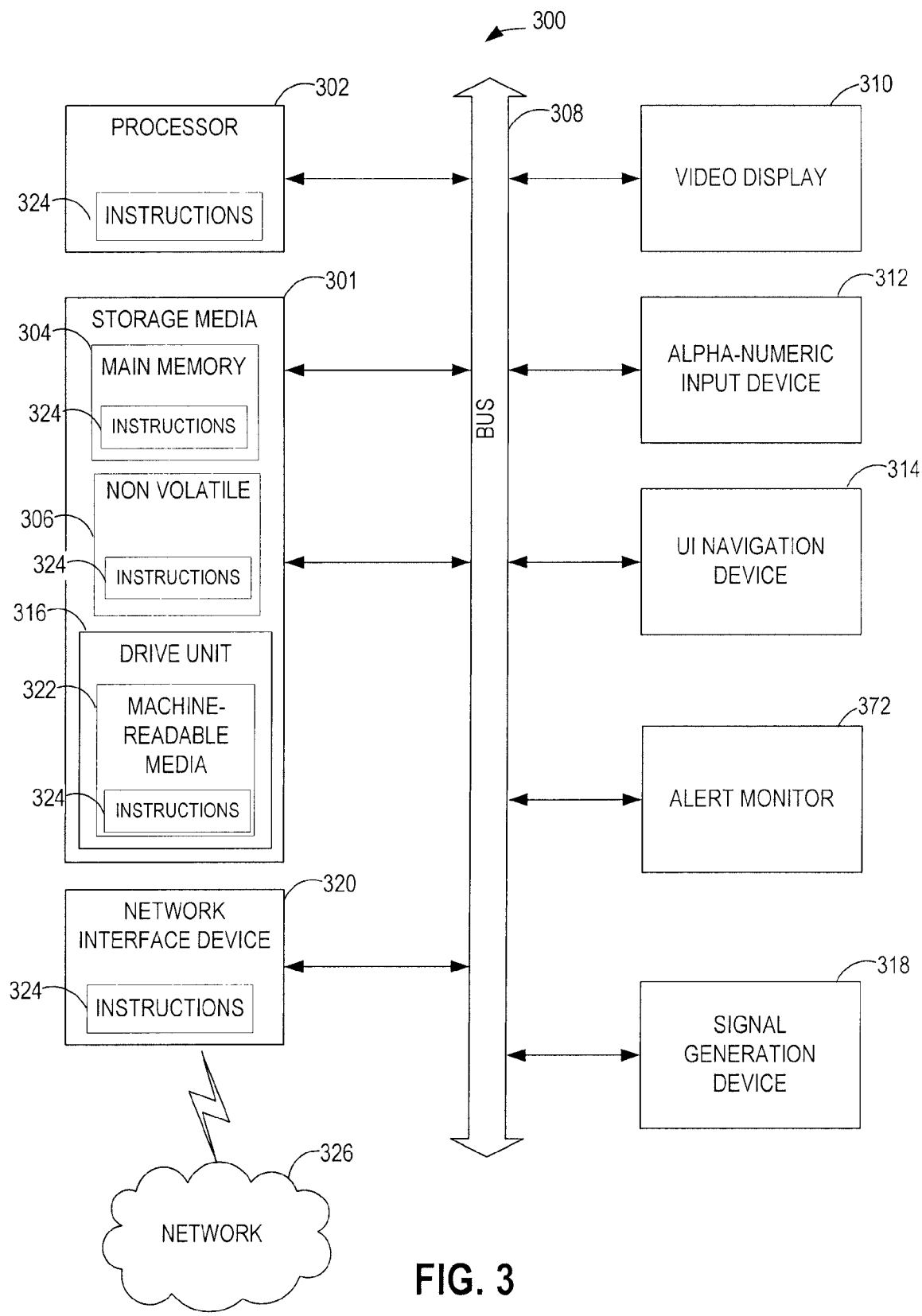
FIG. 3 illustrates a data processing system for use with disclosed embodiments to temporarily delay the display of an EAS message.

FIG. 3 illustrates, in block diagram form, selected elements of an embodiment of a data processing system 300 within which a set of instructions operates to perform the methodologies discussed herein. Data processing system 300 may operate as a standalone device or may be connected (e.g., networked) to other data processing systems. In a networked deployment, data processing system 300 may operate in the capacity of a server or a client data processing system in a server-client network environment, or as a peer computer in a peer-to-peer (or distributed) network environment. Example data processing systems include, but are not limited to, an EAC controller, an EAS encoder, a digital video recorder, a personal computer (PC), a tablet PC, an STB, a cable box, a satellite box, an EPG box, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown in FIG. 3, data processing system 300 includes a processor 302 (e.g., a central processing unit, a graphics processing unit, or both) and storage media 301 that includes a main memory 304 and a non-volatile memory 306. Disk drive unit 316 and other components of storage media 301 communicate with processor 302 via bus 308. Disk drive unit 316 includes a magnetic or solid state machine-readable medium 322 that may have stored thereon one or more sets of instructions 324 and data structures (not depicted) embodying or utilized by any one or more of the methodologies or functions described herein. The instructions 324 may also reside, completely or at least partially, within the main memory 304, within non-volatile memory 306, within network interface device 320, and/or within the processor 302 during execution thereof by the data processing system 300. In some embodiments, main memory 304 and/or the non-volatile memory 306 may be used to store the indicators or values that relate to multimedia content accessed or requested by a consumer. Data processing system 300 may further include a video display unit 310 (e.g., a television, a liquid crystal display or a cathode ray tube) on which to display multimedia content such as textual information for an emergency alert, EPGs, and the like. Data processing system 300 also includes alphanumeric input device 312 (e.g., a keyboard), user interface (UI) navigation device 314 (e.g., a remote control device or a mouse), signal generation device 318 (e.g., a speaker) and network interface device 320. Input device 312 and/or UI navigation device 314 (e.g., a remote control device) may include processors (not shown), and further memory (not shown).

Instructions 324 may be transmitted or received over a network 326 (e.g., a multimedia content provider network) via network interface device 320 using any one of a number of transfer protocols (e.g., broadcast transmissions, HTTP). While the machine-readable medium 322 is depicted as a single medium, the term "machine-readable medium" should be construed as including a single medium or multiple media (e.g., a centralized or distributed database, and/or associated caches and servers) that may store all or part of instructions 324. The term "machine-readable medium" shall also be taken to include any medium that is capable of storing, encoding, or carrying a set of instructions (e.g. instructions 324) for execution by a machine (e.g., data processing system 300) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some embodiments, data processing system 300 provides delayable emergency alerts during presentation of multimedia programs. Accordingly, instructions 324 include instructions for encoding a multimedia program, encoding an emergency alert message, displaying the multimedia program and the emergency alert message (as an overlay to a portion of the multimedia program), and receiving user input for stopping the displaying of the emergency alert message for a configurable period. Further instructions, in some embodiments, receive user input that sets a snooze period during which the displaying of the emergency alert message is temporarily stopped. Additionally, in some embodiments, a portion of instructions 324 monitor (e.g., using alert monitor 372) one or more local primary stations for an emergency occurrence. If an emergency occurrence is detected, instructions 324 enable data processing system 300 to encode and prepare the emergency alert message for display as an overlay to a multimedia program. Instructions 324 may include instructions for displaying user selectable elements, within a graphical interface for example, to allow a user to provide user input to dismiss (permanently or temporarily) emergency alert messages.

Figure 4:
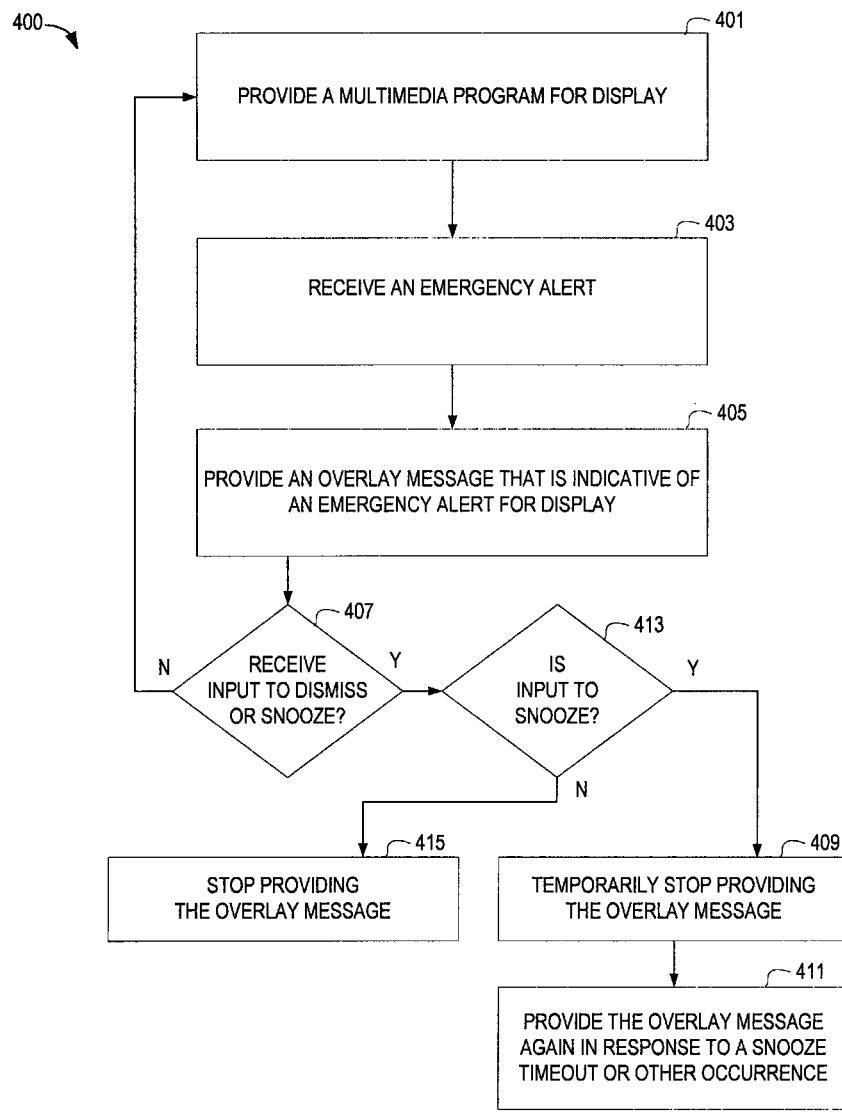
FIG. 4 depicts selected elements of a methodology for delaying the display of EAS messages received through the multimedia content distribution network of FIG. 1.

FIG. 4 depicts selected operations of an embodiment of a method 400 for providing emergency alerts through an MCDN (e.g. MCDN 100 from FIG. 1). As shown, method 400 includes providing (block 401) a multimedia program for display, receiving (block 403) an emergency alert, and providing (block 405) an overlay message indicative of the emergency alert for display. If a user provides input to snooze the overlaid emergency alert message (block 407 and block 413), the overlay message is temporarily no longer provided (block 409) and then after a snooze timeout or other occurrence, such as the start of a commercial, the overlay message is once again provided (block 411). If a user provides input to dismiss the overlaid emergency alert message (block 407 and block 413), the overlay message is no longer provided (block 415). If no user input is detected for dismissing or snoozing the emergency alert message, method 400 continues to provide (block 401 and block 405) the multimedia program with the overlaid message indicative of the emergency alert. Additionally, if no input is received to dismiss or snooze the emergency alert, method 400 updates (not depicted) or receives (block 403) updated emergency alerts or an indication that the emergency alert is still relevant. In some embodiments, user input is provided to set the snooze timeout duration. In some cases, the snooze timeout may correspond to the end of a program currently being displayed or the beginning of a commercial.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. An emergency alert method, comprising:
   monitoring a plurality of news providers including a first news provider and a second news provider;
   responsive to detecting a first report, from the first news provider, of an emergency event, monitoring for a second report, from the second news provider, confirming the first report;
   responsive to detecting the second report, from the second news provider, confirming the first report:
      sending an overlay message with a multimedia program, wherein the overlay message includes an emergency alert indicative of the emergency event; and
      providing a selectable graphic element with the overlay message, wherein the selectable graphic element is used by a user to perform an operation selected from:
         snoozing the overlay message responsive to a user selection of a snooze element of the selectable graphic element, wherein snoozing comprises temporarily suspending the overlay message for a user configured snooze period; and
         dismissing the overlay message responsive to a user selection of a dismiss element, wherein dismissing comprises permanently terminating the providing of the overlay message.

2. The method of claim 1, the method further comprising: forwarding the overlay message to a user specified communication device.

3. The method of claim 1, wherein the dismiss element is provided using a graphical interface processed by a set-top box, wherein navigation of the graphical interface is performed through a remote control device that is communicatively coupled to the set-top box.

4. The method of claim 1, the method further comprising: providing the overlay message again after a snooze period expires.

5. The method of claim 1, the method further comprising: providing the overlay message again in response to detecting a commercial in the multimedia program.

6. The method of claim 1, the method further comprising: receiving an emergency alert system alert, wherein the overlay message is indicative of the emergency alert system alert;
   encoding the emergency alert system alert;
   relaying the encoded emergency alert system alert to a content server; and
   distributing the encoded emergency alert system alert to a plurality of customer premises equipment.

7. A data processing system, comprising:
   a processor; and
   computer readable storage including instructions, executable by the processor, to cause the processor to perform operations including:
      monitoring a plurality of news providers including a first news provider and a second news provider;
      responsive to detecting a first report, from the first news provider, of an emergency event, monitoring for a second report, from the second news provider, confirming the first report;
      responsive to detecting the second report, from the second news provider, confirming the first report:
         sending an overlay message with a multimedia program, wherein the overlay message includes an emergency alert indicative of the emergency event; and
         providing a selectable graphic element with the overlay message, wherein the selectable graphic element is used by a user to perform an operation selected from:
            snoozing the overlay message responsive to a user selection of a snooze element of the selectable graphic element, wherein snoozing comprises temporarily suspending the overlay message for a user configured snooze period; and
            dismissing the overlay message responsive to a user selection of a dismiss element, wherein dismissing comprises permanently terminating the providing of the overlay message.

8. The data processing system of claim 7, wherein the data processing system is a customer premises equipment.

9. The data processing system of claim 8, wherein the data processing system is integrated within a set-top box.

10. The data processing system of claim 7, wherein the operations include modifying the snooze period responsive to user input.

11. A non-transitory computer readable medium including stored, processor executable instructions that, when executed by a processor, cause the processor to perform operations comprising:
   monitoring a plurality of news providers including a first news provider and a second news provider;
   responsive to detecting a first report, from the first news provider, of an emergency event, monitoring for a second report, from the second news provider, confirming the first report;
   responsive to detecting the second report, from the second news provider, confirming the first report:
      generating an overlay message wherein a selectable graphic element is configured to enable a user to perform an operation selected from:
         snoozing the overlay message responsive to a user selection of a snooze element of the selectable graphic element, wherein snoozing comprises temporarily suspending the overlay message for a user configured snooze period; and
         dismissing the overlay message responsive to a user selection of a dismiss element, wherein dismissing comprises permanently terminating the providing of the overlay message.

12. The non-transitory computer readable medium of claim 11, wherein the operations includes:
   forwarding the overlay message to a user specified communication device.

13. The non-transitory computer readable program of claim 12, wherein the user specified communication device is a mobile telephone.

* * * * *